though slight, increases progressively from the line of contact of the wedge surface 29 with the edge 19 of hole 15 outwardly along the slot. Because of the progressively increasing space in the slot as it extends outwardly, the flared portion of the wall 14 does not engage the end 32 of the hub 11 and all of the tightening action of the hub on the wedge adapter 10 is transmitted to the wall 14 at the point of engagement of the edge 36 with the outer surface 18 of the wall 14 and at the line of contact of the wedge surface 29 with the edge 19 of the hole 15.

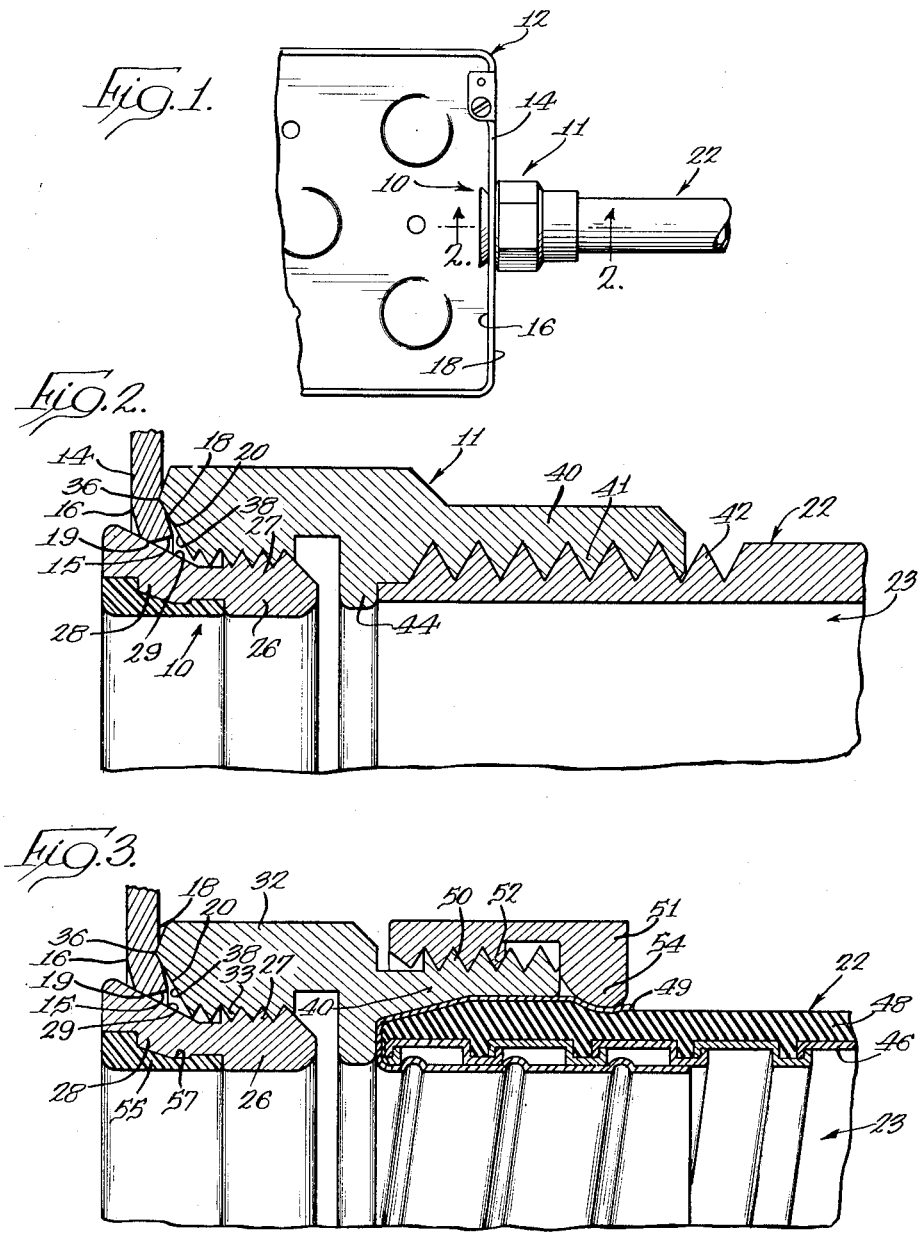

3,055,683

FLUID-TIGHT ELECTRICAL CONNECTOR
Arthur I. Appleton, % Appleton Electric Company, 1701–1759 Wellington Ave., Chicago 13, Ill.
Filed Dec. 30, 1957, Ser. No. 705,901
3 Claims. (Cl. 285—158)

The present invention relates to a fluid-tight connector for use in securing pipe or conduit to a connecting box or housing and finds particular, but not exclusive, utility in anchoring electrical conduit to electrical outlet boxes, switch boxes, junction boxes and the like. The present invention may be advantageously embodied in a connector for use on machine tools or in industrial applications including fluids or explosive materials.

The invention is concerned with improvements over the connectors of the general type shown in United States Patent No. 2,674,470, issued August 6, 1954, to Arthur I. Appleton, and United States Patent No. 1,879,920, issued September 27, 1932, to Louis H. Church.

One object of the present invention is to provide a new and improved two-piece connector which is easily installed in fluid-tight relation on an electrical box or other appropriate housing and which remains tight under vibration of the box mounting so as to positively exclude liquids, fumes, chips, shavings and other foreign matter from the electrical connection within the box.

Another object of the present invention is to provide a connector of the foregoing characteristics which can be mounted in place easily and rapidly with only the use of one wrench outside of the box.

A further object of the present invention is to provide a connector of the above type which forms a cold-weld seal with the box thereby maintaining a fluid-tight seal without the use of a resilient sealing member, such as an O-ring, as well as maintaining a positive metal-to-metal ground connection.

Still another object of the present invention is to provide a connector of the above character which tightens in place with a minimum projection into the box thereby increasing wiring room therein and which is formed with an insulated throat thereby affording protection against wire damage and eliminating the need for an end bushing.

Other objects and advantages of the present invention will become apparent as the following description proceeds taken in connection with the accompanying drawing wherein:

FIGURE 1 is an elevation view of a box connector embodying the present invention mounting a conduit to an electrical box.

FIG. 2 is an enlarged fragmentary sectional view through the connector shown in FIG. 1 and taken substantially in the plane of line 2—2 thereof.

FIG. 3 is a view similar to FIG. 2 but showing a connector illustrative of the present invention adapted for use with a sheathed flexible conduit.

Although certain illustrative electrical connectors embodying the present invention have been shown in the drawing and will be described in considerable detail, it should be understood that there is no intention to limit the invention to the specific forms disclosed but, on the contrary, the intention is to cover all modifications, alternatives, equivalents and uses falling within the spirit and scope of the invention as expressed in the appended claims.

A box connector illustratively embodying the present invention and affording a fluid-tight positive ground vibration resistant mounting of an electrical conduit to a box is shown in the drawing and is comprised generally of two parts, a wedge adapter 10 and a hub 11. The box, designated generally at 12, may be of any form of electrical or other box having a wall 14 through which a conduit fitting receiving aperture 15 is defined. The box wall has an inner surface 16, an outer surface 18 and the hole 15 will be defined by annular edges 19, 20 in each of the respective surfaces.

The wedge adapter member 10 is inserted from the inside of the box 12 through the opening 15 in the box wall 14 and is threadably engaged with the hub 11 located externally of the box and formed with any one of a number of different means for mounting a conduit 22. The hub 11 on the outside of the box 12 and the wedge adapter 10 from the inside of the box cooperate to provide the desired mounting for the conduit 22 and permit unrestricted communication between the bore 23 of the conduit and the interior of the box for the passage of electrical wiring (not shown).

In order to effect a secure, fluid-tight, positive ground connection between the conduit 22 and the box wall 14, the wedge adapter 10 is fashioned in the form of an annular or sleeve shaped body having an outer sleeve portion 26 of somewhat smaller diameter than the box hole 15 and including screw threads 27 on its outer surface, and an inner sleeve portion 28. On the inner sleeve portion 28 of the body is located a tapering wedge surface 29 in the form of a generally frusto-conical head presenting a tapered surface which gradually decreases in diameter toward the threaded end portion 26 of the adapter. The wedge surface 29 has its largest diameter at its inner end and as can be seen, this diameter is greater than the diameter of the hole 15 in the box wall 14. It has been found that a surface sloping at an angle of about 64° gives a satisfactory wedging action.

When the adapter is inserted through the hole 15 with its threaded portion 26 projecting outwardly from the box wall 14, the wedge surface 29 on the inner end portion 28 engages the edge 19 of the hole 15 lying in the inner surface 16 of the wall. The contact of the adapter with the edge 19 of the hole defines a line of contact on the wedge surface.

The hub 11 is also generally sleeve shaped and is formed with an inner end 32 having internal threads 33 for engaging the external threads 27 on the adapter 10, and an outer end 34 having means for receiving and engaging an inserted end of a conduit 22.

For abutting and sealingly engaging the box wall, the inner end 32 of the hub 11 is shaped to a sharp annular edge 36 which, when the hub 11 is tightened to the adapter 10, engages and bites into the outer surface 18 of the box wall 14. This edge 36 is spaced from the end of the threads 33 thereby defining an internal sloping annular surface 38 on the end of the hub. For reasons which will hereinafter be apparent, the slope of this surface is slightly greater than the slope of the wedging surface on the wedge adapter. As a result, the annular surfaces 29 and 38 on the wedge adapter and the hub, respectively, define a wedge-shaped annular slot.

When the hub 11 has been threaded onto the adapter 10 and, with the sharp annular end 36 abutting the box wall 18, a continued tightening of the hub 11 causes this edge to bite into the box wall and draw the wedge adapter into the hole 15 with result that a powerful wedging action is exerted on the portion of the box wall 14 surrounding the hole 15. As the hub is further tightened, this powerful wedging action deforms that portion of the box wall between the points of contact of the wall with the hub 11 and with the adapter 10, and flares that portion of the wall outwardly.

Flaring of the box wall 14 as the hub 11 is tightened onto the wedge adapter 10 deforms and cold works the wall into the wedge-shaped slot formed between the sloping annular surfaces 29 and 38 on the adapter and hub, respectively. Because the slot is wedge shaped, the space for receiving the wall decreases and, as a result, the box wall is deformed under substantial pressure. This high-pressure deformation results in a cold weld-like engagement between the box wall and the wedge adapter 10. Such an engagement is fluid tight, making the connector suitable for use in explosive atmospheres. Furthermore, with the cold weld-like engagement, a positive electrical ground connection is formed between the box and the connector.

The hub 11 and adapter 10 can be tightened to the box wall 14 to produce a seal and connection of the foregoing character by the use of a wrench only on the hub and external of the box even though the annular surface 29 of the wedge adapter 10 is smooth. This is believed to be possible because the strength of the cold weld-like engagement between the box wall and the adapter increases as the hub is tightened and the box wall is deformed into the wedge slot. Accordingly, the need for ridges or gripping teeth on the annular surface 29 of the adapter 10 is eliminated and thus passages for fluids are not present in the fitting, thereby making the fitting fluid tight and capable of excluding harmful or explosive fluids from the box interior.

The connector being secured to the box wall in a manner (described above) affording an extremely effective seal and positive ground connection, means are desirably provided for connecting the conduit 22 to the connector also to provide a fluid-tight and positive ground connection. Two different means are shown in FIGS. 2 and 3, although other means could be used as well.

In FIG. 2, the hub 11 is formed with an extending sleeve portion 40 having internal threads 41 engageable with external threads 42 on the conduit 22. For preventing the engagement of the conduit 22 with the hub 11 from loosening the engagement between the hub 11 and the wedge adapter 10, the hub is formed with an intermediate inner annular shoulder 44 between its sleeve end portions. This shoulder abuttingly engages the inserted end of the conduit 22, thereby affording a tight connection between the conduit and the hub and yet precluding contact engagement between the conduit and the wedge adapter which contact may tend to loosen the connection between the adapter 10, hub 11, and the box wall 14.

The fitting conduit shown in FIG. 3 is of a type useful for attaching flexible conduit to a box wall. One form of flexible conduit is known in the trade as "Seal-tight" conduit and is formed with a flexible metal conduit 46 surrounded by a sheath 48 of resilient material. For securing this conduit to a box, one end is inserted into a cup-shaped annular brass ferrule 49 which is, in turn, inserted into a hub 11 having external threads 50 on its extending sleeve portion 40. A tightening nut 51 having internal threads 52 is then threadably secured to the hub. As the nut 51 is tightened in place, an internal shoulder 54 thereon deforms the outer skirt-portion of the ferrule 49 into sealing engagement with the resilient conduit cover 48. For a more detailed description of this conduit and fitting therefor, reference should be made to U.S. Patent No. 2,782,060, issued February 19, 1957, to Arthur I. Appleton.

For purposes of preventing damage to electrical wiring carried in the conduit 22 through the hub 11 and adapter 10 into the box 12, the wedge adapter 10 is provided with an internal plastic insulation bushing 55 secured in place as shown in FIG. 2. The bushing is generally an annular plastic ring having a smooth internal surface. For mounting this bushing in place, the inner surface of the adapter 10 is formed with an annular shoulder 56 adapted to be received in a corresponding annular groove 57 on the bushing. The bushing may thus be press fitted into place and will be retained within the adapter.

It will be apparent to those skilled in the art that the present invention is useful with other modified forms of conduit engaging hubs. For example, the hub may be formed with an outer end portion defining a smooth internal sleeve for receiving an inserted end of a conduit carry an O-ring type seal. Fittings of this sort are employed where it is desired to be able to remove the conduit without disturbing the mounting of the hub on a box or the like, or where it is desired to mount a conduit between two fixed boxes.

For sealing an opening in a box, the hubs may be shaped in the form of a cap. An effective fluid-tight plug can thus be provided while, at a later time, it is possible to open by merely removing the cap and inserting in its place a conduit receiving hub.

I claim as my invention:

1. A connector for securing a pipe or conduit in fluid-tight relation to a box or the like with the conduit opening into the box through a substantially circular aperture in a wall thereof, said connector comprising, in combination, a rigid annular member of material relatively hard with respect to the material of the box, adapted to conform to said wall aperture and having an inner end and an outer end; a threaded portion adjacent said outer end of said annular member; a radially enlarged head adjacent said inner end of said annular member and having a smooth continuous frusto-conical surface of greater diameter than said threaded portion, the base of said frusto-conical surface having a greater diameter than said substantially circular aperture, said frusto-conical surface tapering toward said threaded portion of said annular member; a hub disposed in threaded engagement with said threaded portion of said annular member and in solid abutting engagement against one side of said box wall, one end of said hub having a relatively sharp annular edge of a diameter larger than the diameter of said wall aperture and defining a continuous annular area of fluid-tight sealing contact on one side of said box wall surrounding said wall aperture, said hub also being adapted to forcibly urge said radially enlarged head into said wall aperture and defining another continuous annular area of fluid-tight sealing contact with the edge of said wall aperture at the other side of said box wall, engagement between said frusto-conical surface and said aperture edge as said hub is tightened against the box wall serving to cold work and deform the box wall material adjacent said aperture into fluid-tight sealing engagement with said frusto-conical surface, the slope of said frusto-conical surface being sufficiently small so that said annular member is prevented from rotating when forced into engagement with said edge of said wall aperture when said hub is tightened thereon; and means on the other end of said hub for engagement with a conduit.

2. A connector as defined in claim 1 wherein the slope of said frusto-conical surface of said radially enlarged head is at an angle of about 64°.

3. A connector as defined in claim 1 wherein said one end of said hub having the relatively sharp annular edge thereon is sloped inwardly and downwardly from said relatively sharp annular edge and toward the threaded portion of said hub at a greater angle than the angle of slope of said frusto-conical surface to define between said sloping surfaces a wedge-shaped annular slot adapted to receive therein the deformed portion of the box wall material adjacent the aperture in said box wall as said hub is tightened against the box wall.

References Cited in the file of this patent

UNITED STATES PATENTS

| | | |
|---|---|---|
| 1,632,843 | Ludlow | June 21, 1927 |
| 1,855,447 | Hagstedt | Apr. 26, 1932 |
| 1,887,423 | Parker | Nov. 8, 1932 |
| 2,052,394 | Fullman | Aug. 25, 1936 |
| 2,454,465 | Leo | Nov. 23, 1948 |
| 2,589,338 | Candelise | Mar. 18, 1952 |
| 2,798,744 | Budnick | July 9, 1957 |